(12) United States Patent
Cheng et al.

(10) Patent No.: US 9,110,539 B2
(45) Date of Patent: Aug. 18, 2015

(54) PHOTO SENSOR OF A PHOTO TYPE TOUCH PANEL AND CONTROL METHOD THEREOF

(75) Inventors: Yi-Ru Cheng, Hsin-Chu (TW); Ya-Ling Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 412 days.

(21) Appl. No.: 13/558,347

(22) Filed: Jul. 26, 2012

(65) Prior Publication Data
US 2013/0093729 A1 Apr. 18, 2013

(30) Foreign Application Priority Data
Oct. 14, 2011 (TW) .............................. 100137274 A

(51) Int. Cl.
G06F 3/042 (2006.01)
G06F 3/041 (2006.01)

(52) U.S. Cl.
CPC .............. G06F 3/042 (2013.01); G06F 3/0412 (2013.01); G06F 3/0416 (2013.01)

(58) Field of Classification Search
CPC ..... G06F 3/042; G06F 3/0416; G06F 3/0412; G06F 3/0304

USPC ..................................................... 345/81, 175
See application file for complete search history.

(56) References Cited

U.S. PATENT DOCUMENTS

| 7,773,139 | B2 | 8/2010 | Den |
| 2007/0109239 | A1 | 5/2007 | Den |
| 2010/0097354 | A1* | 4/2010 | Ahn et al. ..................... 345/175 |
| 2010/0308345 | A1* | 12/2010 | Brown et al. .................. 257/82 |

FOREIGN PATENT DOCUMENTS

CN 102207647 10/2011

* cited by examiner

*Primary Examiner* — William Boddie
*Assistant Examiner* — Sahlu Okebato
(74) *Attorney, Agent, or Firm* — Winston Hsu; Scott Margo

(57) ABSTRACT

The present invention provides a photo sensor of a photo type touch panel, which includes a transistor with a control terminal receiving a first control signal, a first capacitor electrically connected to a first terminal of the transistor, a first photo transistor with a first terminal electrically connected to the first capacitor, and a second photo transistor with a control terminal receiving a second control signal, a first terminal electrically connected to a second terminal of the first photo transistor, and a second terminal receiving a third control signal.

12 Claims, 11 Drawing Sheets

PHOTO SENSOR OF A PHOTO TYPE TOUCH PANEL AND CONTROL METHOD THEREOF

BACKGROUND OF THE INVENTION

1. Field of the Invention

The present invention relates to a photo sensor of a photo type touch panel, and more particularly, to a photo sensor of a photo type touch panel with increased working area.

2. Description of the Prior Art

Please refer to FIG. 1 and FIG. 2 together. FIG. 1 is a diagram showing a photo type touch panel 100 of the prior art. FIG. 2 is a diagram showing a photo sensor of the photo type touch panel in FIG. 1. As shown in the figures, the photo type touch panel 100 comprises a plurality of pixels P arranged in a matrix form, a plurality of data lines D for transmitting display data to the plurality of pixels P, a plurality of scan lines W for transmitting scan signals to the plurality of pixels P, a plurality of photo sensors 110, a reading unit 120, and a plurality of scan lines G for controlling the photo sensors 110. Each photo sensor 110 comprises a transistor 112, a capacitor 114, and a photo transistor 116. A control terminal of the transistor 112 is electrically connected to a first scan line G1. The capacitor 114 is electrically connected to a first terminal of the transistor 112. The reading unit 120 is electrically connected to a second terminal of the transistor 112 for reading a voltage level of the capacitor 114 when the transistor 112 is turned on. A control terminal of the photo transistor 116 is electrically connected to a second scan line G2, a first terminal of the photo transistor 116 is electrically connected to the capacitor 114, and a second terminal of the photo transistor 116 is electrically connected to a third scan line G3.

Please refer to FIG. 3, and refer to FIG. 2 as well. FIG. 3 is a diagram showing related signals of the photo sensor of the prior art. When the photo sensor 110 operates, in a first period T1, a voltage signal $V_{G1}$ of the first scan line G1 is risen to high potential for turning on the transistor 112, a voltage signal $V_{G2}$ of the second scan line G2 is at low potential (-aV) for turning off the photo transistor 116, and a voltage signal $V_{G3}$ of the third scan line G3 is also at low potential (-bV), wherein a voltage difference between the voltage signal $V_{G2}$ and the voltage signal $V_{G3}$ is kept at a specific value. The reading unit 120 then reads the voltage level of the capacitor 114 and resets the voltage level of the capacitor 114 to a reference level.

In a second period T2, the voltage signal $V_{G1}$ of the first scan line G1 is lowered to low potential for turning off the transistor 112, the voltage signal $V_{G2}$ of the second scan line G2 is risen to high potential (-aV+ΔV1) for turning on the photo transistor 116, and the voltage signal $V_{G3}$ of the third scan line G3 is also risen to high potential (-bV+ΔV2) for keeping a specific voltage relationship with the voltage signal $V_{G2}$, and the third scan line G3 charges the capacitor 114 for making the voltage level of the capacitor 114 equal to the voltage level of the third scan line G3.

In a third period T3, the voltage signal $V_{G1}$ of the first scan line G1 is kept at low potential for turning off the transistor 112, the voltage signal $V_{G2}$ of the second scan line G2 is lowered to low potential (-aV) for turning off the photo transistor 116, and the voltage signal $V_{G3}$ of the third scan line G3 is also lowered to low potential (-bV) for keeping the specific voltage difference with the voltage signal $V_{G2}$. Although the photo transistor 116 is turned off, when the photo transistor 116 is illuminated, a leakage current flowing through the photo transistor 116 is larger according to a voltage difference between the control terminal g (gate terminal) and the second terminal s (source terminal); and when the photo transistor 116 is not illuminated, the leakage current flowing through the photo transistor 116 is smaller. Therefore, the voltage level of the capacitor 114 is gradually decreased due to the leakage current of the photo transistor 116.

In a fourth period T4, the voltage signal $V_{G1}$ of the first scan line G1 is risen to high potential for turning on the transistor 112, the voltage signal $V_{G2}$ of the second scan line G2 is kept at low potential (-aV) for turning off the photo transistor 116, and the voltage signal $V_{G3}$ of the third scan line G3 is also kept at low potential (-bV) for keeping the specific voltage difference with the voltage signal $V_{G2}$. The reading unit 120 then again reads the voltage level of the capacitor 114 for determining whether the photo sensor 110 is touched according to the voltage level of the capacitor 114.

Please refer to FIG. 4. FIG. 4 is a diagram showing characteristic curves of the photo sensor 110 of the prior art before and after long term operation. A horizontal axis of FIG. 4 represents the voltage difference Vgs between the control terminal g and the second terminal s of the photo transistor, and the vertical axis of FIG. 4 represents the voltage level Vout read by the reading unit 120. The reading unit determines how much electricity leaked from the capacitor 114 according to how much electricity charged to the capacitor 114, thus if the voltage level Vout read by the reading unit 120 is higher, the leakage current of the capacitor 114 is larger. The voltage level Vout read by the reading unit 120 can be utilized to determine whether the photo sensor 110 is touched. For example, when the voltage level Vout read by the reading unit 120 is higher than a predetermined value, it is determined that the photo sensor 110 is touched; and when the voltage level Vout read by the reading unit 120 is lower than the predetermined value, it is determined that the photo sensor 110 is not touched. A working area of the photo sensor 110 may significantly changed when the control terminal g and the second terminal s of the photo transistor 116 are continuously applied with working voltages for a long time or the photo transistor 116 is illuminated for a long time. As shown in FIG. 4, at a beginning state (without being applied with working voltages or illuminated for a long time), a working area B formed between a illuminated curve and a non-illuminated curve is located between 0V to -4V of the horizontal axis. After being applied with working voltages or illuminated for a long time, the photo transistor 116 become easy to leak current, so as to change the illuminated curve and the non-illuminated curve, and a working area A is shifted to be located between -3V to -6V of the horizontal axis.

The working area B of the photo sensor 110 at the beginning state is very narrow, and only slightly overlaps with the working area A after long term operation. When the voltage difference Vgs between the control terminal g and the second terminal s of the photo transistor 116 is set to a specific voltage difference (such as -2.5V), the voltage difference Vgs between the control terminal g and the second terminal s of the photo transistor 116 can not be located at the working area A after long term operation. Therefore, after the photo sensor 110 of the photo type touch panel 100 of the prior art operates for a long time, it may cause the reading unit 120 to misjudge.

SUMMARY OF THE INVENTION

The present invention provides a photo sensor of a photo type touch panel, which comprises a transistor with a control terminal receiving a first control signal, a first capacitor electrically connected to a first terminal of the transistor, a first photo transistor with a first terminal electrically connected to the first capacitor, and a second photo transistor with a control terminal receiving a second control signal, a first terminal electrically connected to a second terminal of the first photo transistor, and a second terminal receiving a third control signal, wherein a voltage difference between the control terminal and the second terminal of the first photo transistor is a variable.

The present invention further provides a photo type touch panel, which comprises a plurality of pixels arranged in a matrix form, a plurality of data lines for transmitting display data to the plurality of pixels, a plurality of scan lines for transmitting scan signals to the plurality of pixels, a plurality of photo sensor, and a reading unit. Each photo sensor comprises a transistor with a control terminal electrically connected to a first scan line of the plurality of scan lines, a first capacitor electrically connected to a first terminal of the transistor, a first photo transistor with a first terminal electrically connected to the first capacitor, and a second photo transistor with a control terminal electrically connected to a second scan line of the plurality of scan lines, a first terminal electrically connected to a second terminal of the first photo transistor, and a second terminal electrically connected to a third scan line of the plurality of scan lines. The reading unit is electrically connected a second terminal of the transistor for reading a voltage level of the first capacitor when the transistor is turned on.

The present invention further provides a control method for a photo sensor of a photo type touch panel, the photo sensor comprising a transistor with a control terminal receiving a first control signal, a first capacitor electrically connected to a first terminal of the transistor, a first photo transistor with a control terminal electrically connected to the first capacitor, and a second photo transistor with a control terminal receiving a second control signal, a first terminal electrically connected to a second terminal of the first photo transistor, and a second terminal receiving a third control signal, the method comprising in a first period, providing the first control signal with high potential, and providing the second control signal and the third control signal with low potential; in a second period following the first period, providing the second control signal and the third control signal with high potential, and providing the first control signal with low potential; in a third period following the second period, providing the first control signal, the second control signal, and the third control signal with low potential; and in a fourth period following the third period, providing the first control signal with high potential, providing the second control signal and the third control signal with low potential, and a reading unit of the photo type touch panel reading a voltage level of the first capacitor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
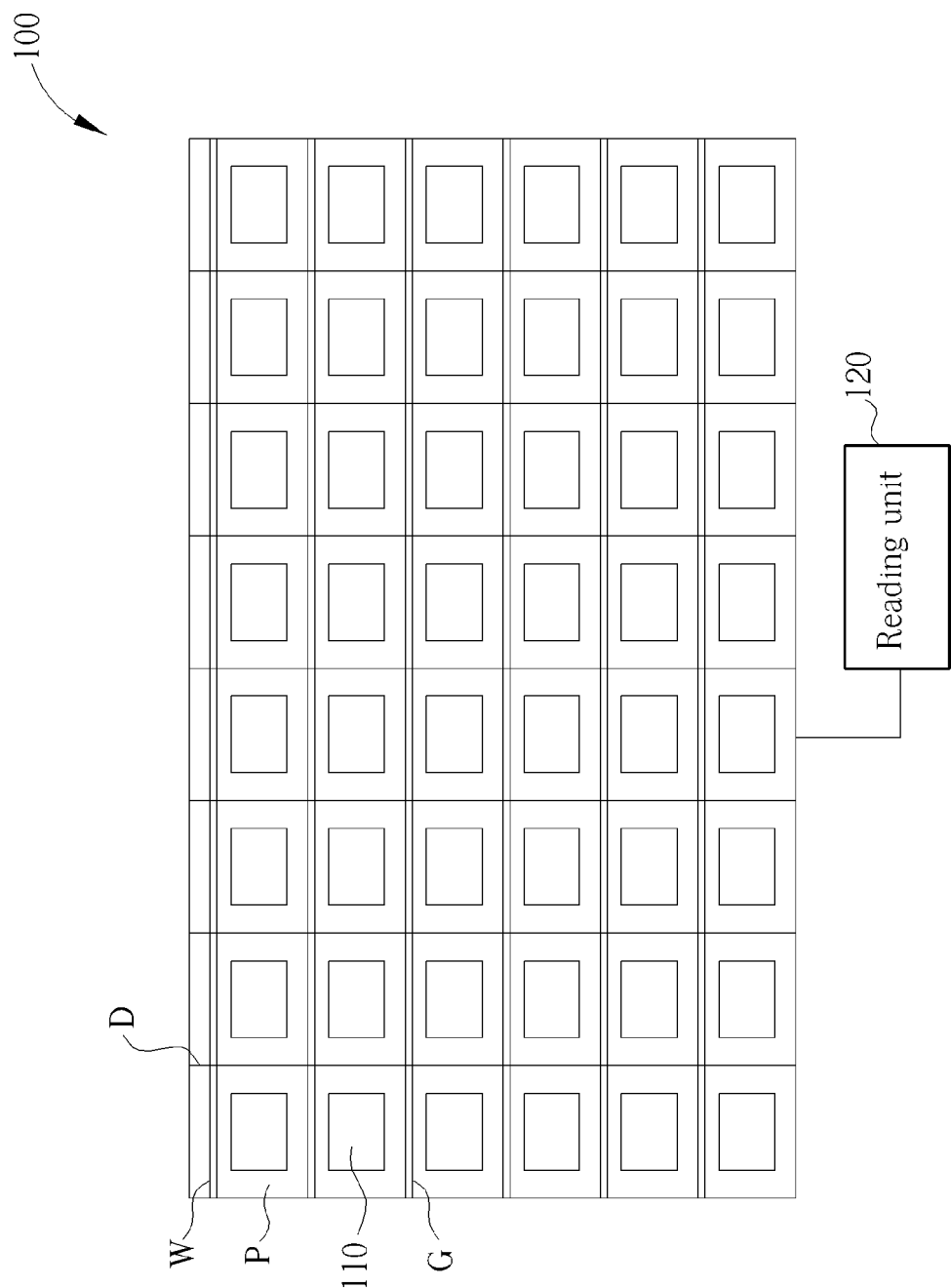
FIG. 1 is a diagram showing a photo type touch panel 100 of the prior art.
Figure 2:
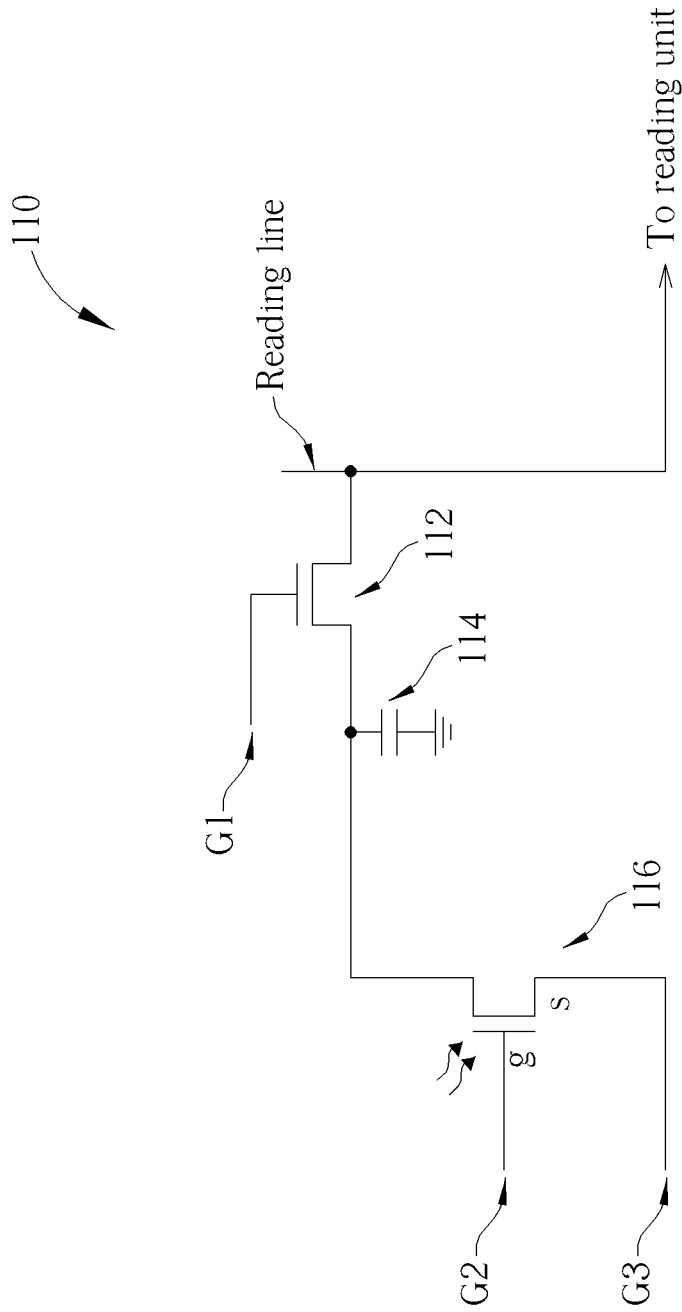
FIG. 2 is a diagram showing a photo sensor of the photo type touch panel in FIG. 1.
Figure 3:
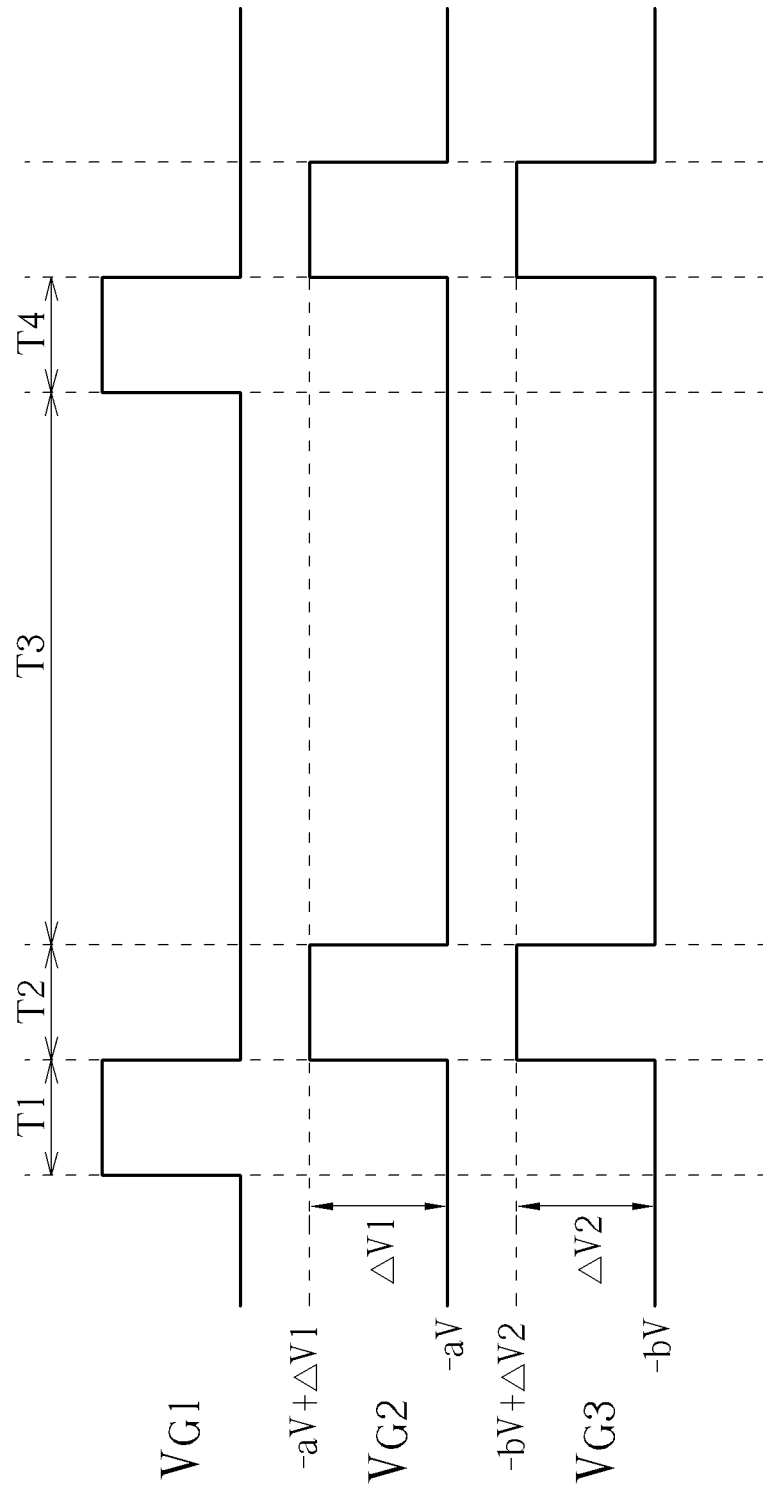
FIG. 3 is a diagram showing related signals of the photo sensor of the prior art.
Figure 4:
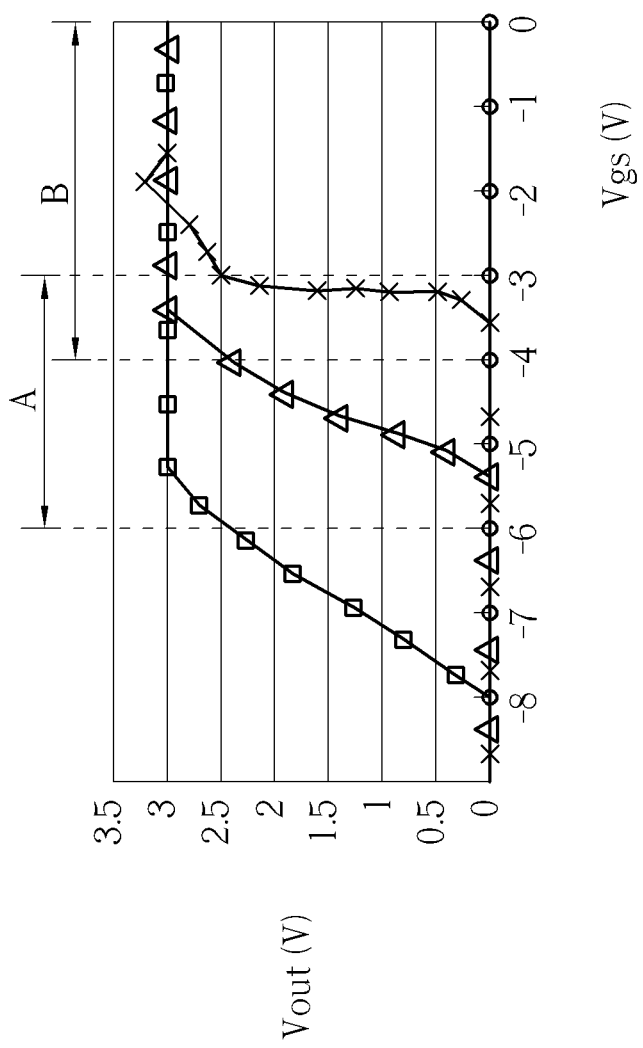
FIG. 4 is a diagram showing characteristic curves of the photo sensor 110 of the prior art before and after long term operation.
Figure 5:
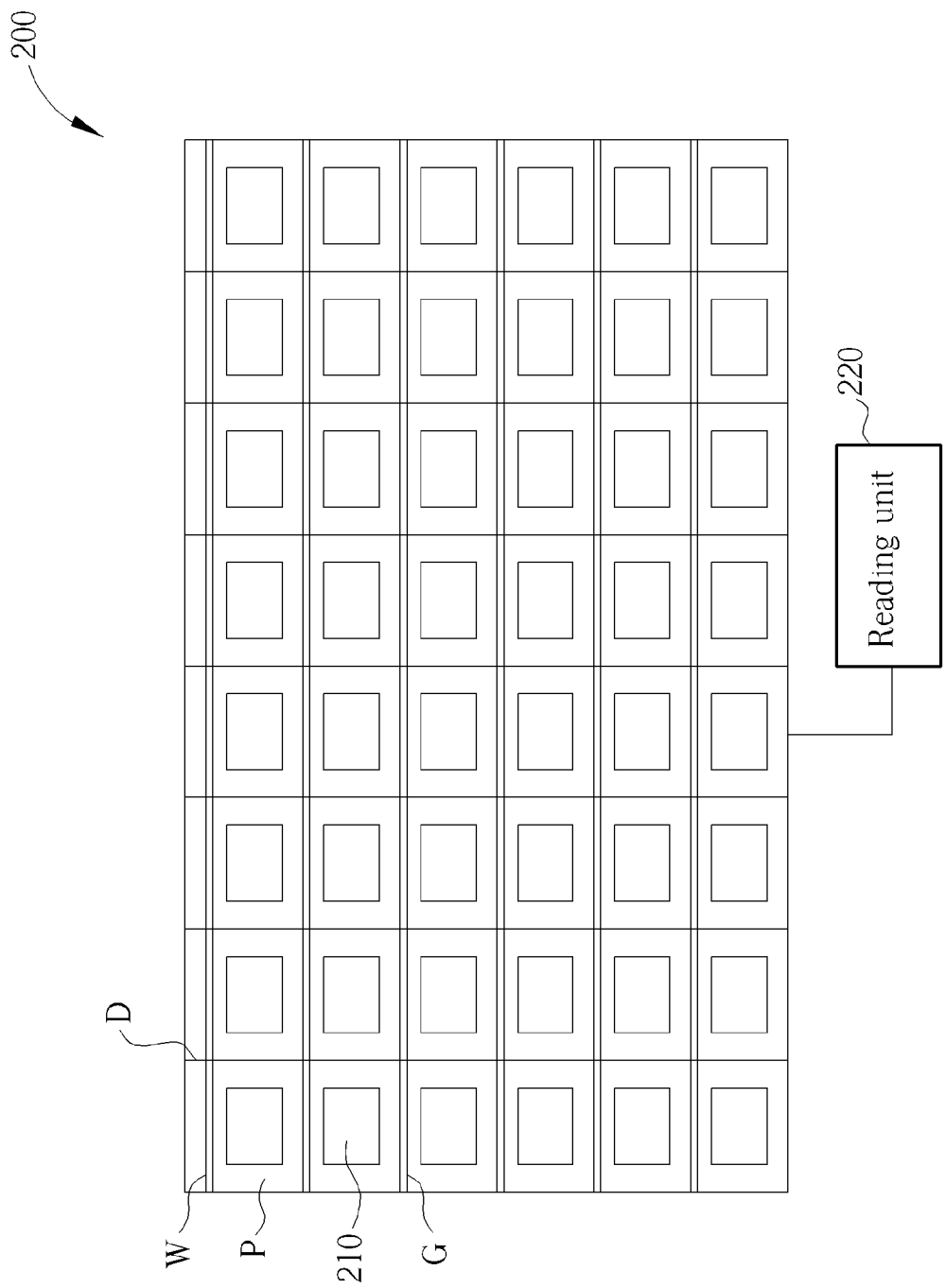
FIG. 5 is a diagram showing a photo type touch panel of the present invention.
Figure 6:
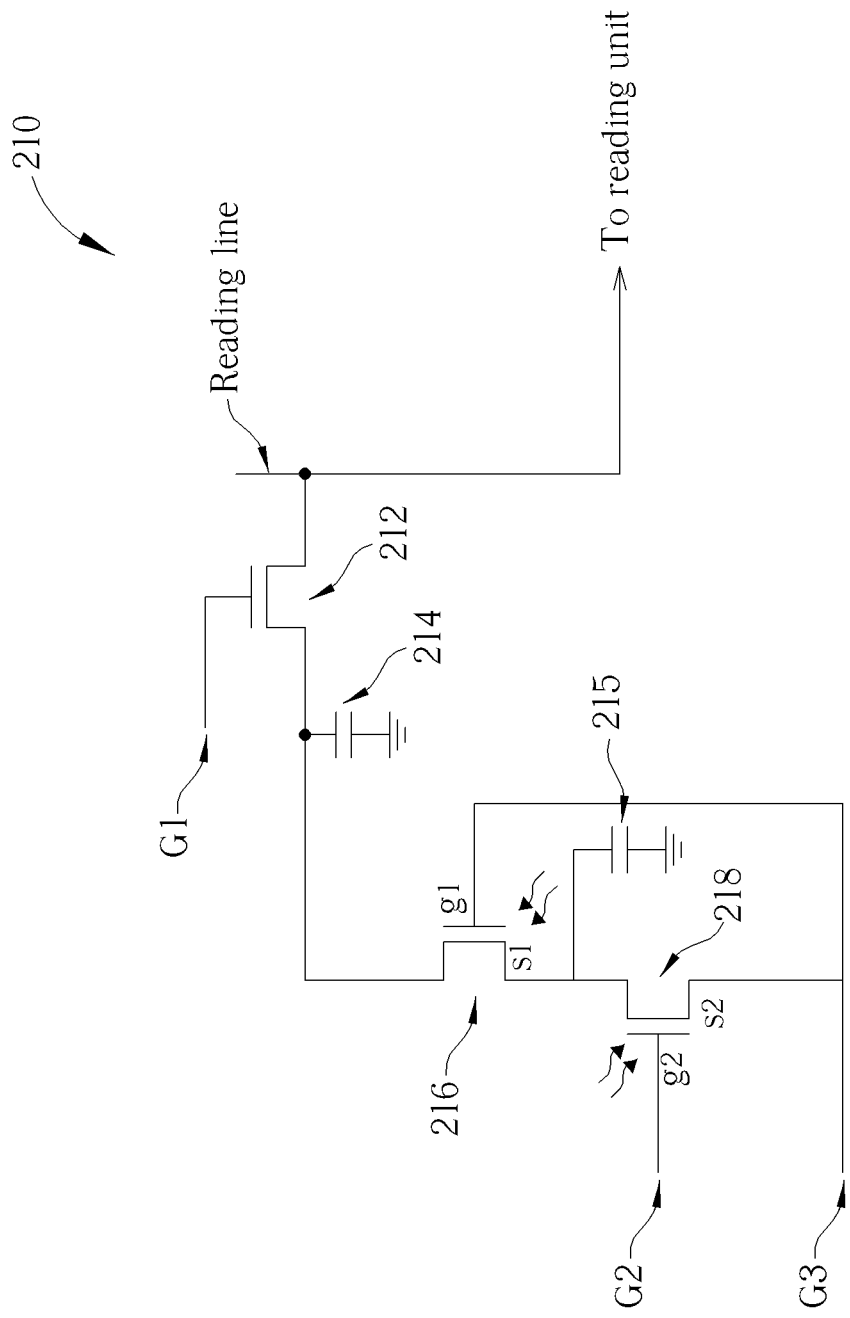
FIG. 6 is a diagram showing a photo sensor of the photo type touch panel in FIG. 5.

Please refer to FIG. 5 and FIG. 6 together. FIG. 5 is a diagram showing a photo type touch panel 200 of the present invention. FIG. 6 is a diagram showing a photo sensor 210 of the photo type touch panel 200 in FIG. 5. As shown in the figures, the photo type touch panel 200 of the present invention comprises a plurality of pixels P arranged in a matrix form, a plurality of data lines D for transmitting display data to the plurality of pixels P, a plurality of scan line groups W for transmitting scan signals to the plurality of pixels P, a plurality of photo sensors 210, a reading unit 220, and a plurality of scan line groups G for controlling the photo sensors 210. Each scan line groups G comprises a first scan line G1, a second scan line G2, and a third scan line G3.

Each photo sensor 210 comprises a transistor 212, a first capacitor 214, and a first photo transistor 216, and a second photo transistor 218. A control terminal of the transistor 212 is electrically connected to the first scan line G1 for receiving a first control signal. The first capacitor 214 is electrically connected to a first terminal of the transistor 212. The reading unit 220 is electrically connected to a second terminal of the transistor 212 for reading a voltage level of the first capacitor 214 when the transistor 212 is turned on. A first terminal of the first photo transistor 216 is electrically connected to the first capacitor 214, and a control terminal of the first photo transistor 216 is electrically connected to the third scan line G3 for receiving a third control signal. A control terminal of the second photo transistor 218 is electrically connected to the second scan line G2 for receiving a second control signal, a first terminal of the second photo transistor 218 is electrically connected to the second terminal of the first photo transistor 216, and a second terminal of the second photo transistor 218 is electrically connected to the third scan line G3. A driving frequency of the scan line groups G can be set to be synchronous or non-synchronous with a driving frequency of the scan line groups W according to touch control requirements.

In another embodiment of the present invention, the scan lines G1 and G2 can be signal lines of the scan line groups W, thus a touch scanning frequency can be synchronous with a pixel scanning frequency.

The following drawing is for illustrating the detail of the photo sensor, the pixel structure is not limited by the following illustration.

Figure 7:
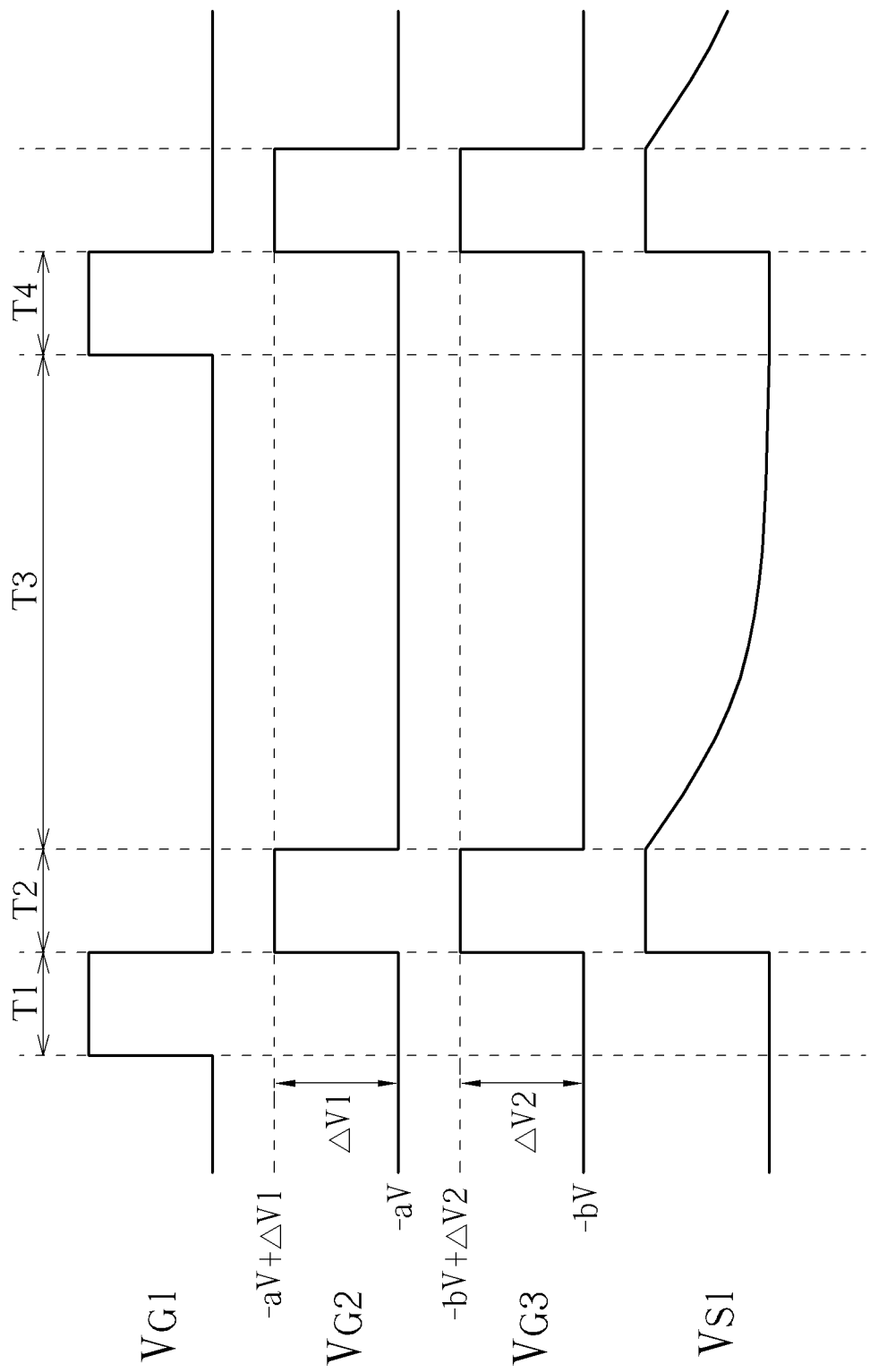
FIG. 7 is a diagram showing related signals of the photo sensor 210 of the present invention.

Please refer to FIG. 7, and refer to FIG. 6 as well. FIG. 7 is a diagram showing related signals of the photo sensor 210 of the present invention. When the photo sensor 210 operates, in a first period T1, a voltage signal $V_{G1}$ of the first scan line G1 is risen to high potential for turning on the transistor 212, a voltage signal $V_{G2}$ of the second scan line G2 is at low potential (−aV) for turning off the second photo transistor 218, and a voltage signal $V_{G3}$ of the third scan line G3 is also at low potential (−bV) for turning off the first photo transistor 216, wherein a voltage difference between the voltage signal $V_{G2}$ and the voltage signal $V_{G3}$ is kept at a specific value. The reading unit 220 then reads the voltage level of the first capacitor 214 and resets the voltage level of the capacitor 214 to a reference level.

In a second period T2, the voltage signal $V_{G1}$ of the first scan line G1 is lowered to low potential for turning off the transistor 212, the voltage signal $V_{G2}$ of the second scan line G2 is risen to high potential (−aV+ΔV1) for turning on the second photo transistor 218, and the voltage signal $V_{G3}$ of the third scan line G3 is also risen to high potential (−bV+ΔV2) for turning on the first photo transistor 216 and keeping a specific voltage relationship with the voltage signal $V_{G2}$, and the third scan line G3 charges the first capacitor 214 for making the voltage level of the first capacitor 214 equal to the voltage level of the third scan line G3. The voltage change ΔV1 of the voltage signal $V_{G2}$ can be equal or not equal to the voltage change ΔV2 of the voltage signal $V_{G3}$ according to design requirements of touch signal strength or voltage arrangement.

In a third period T3, the voltage signal $V_{G1}$ of the first scan line G1 is kept at low potential for turning off the transistor 212, the voltage signal $V_{G2}$ of the second scan line G2 is lowered to low potential (−aV) for turning off the second photo transistor 218, and the voltage signal $V_{G3}$ of the third scan line G3 is also lowered to low potential (−bV) for turning off the first photo transistor 216 and keeping the specific voltage difference with the voltage signal $V_{G2}$. Although the first and second photo transistors 216, 218 are turned off, when the first and second photo transistors 216, 218 are illuminated, a leakage current flowing through the first and second photo transistors 216, 218 is larger according to voltage differences between the control terminal g1, g2 (gate terminal) and the second terminal s1, s2 (source terminal); and when the first and second photo transistors 216, 218 are not illuminated, the leakage current flowing through the first and second photo transistors 216, 218 is smaller. Therefore, the voltage level of the first capacitor 214 is gradually decreased due to the leakage current of the first and second photo transistors 216, 218.

In a fourth period T4, the voltage signal $V_{G1}$ of the first scan line G1 is risen to high potential for turning on the transistor 212, the voltage signal $V_{G2}$ of the second scan line G2 is kept at low potential (−aV) for turning off the second photo transistor 218, and the voltage signal $V_{G3}$ of the third scan line G3 is also kept at low potential (−bV) for turning off the first photo transistor 216 and keeping the specific voltage difference with the voltage signal $V_{G2}$. The reading unit 220 then again reads the voltage level of the first capacitor 214 for determining whether the photo sensor 210 is touched according to the voltage level of the first capacitor 214.

In the above third period T3, a voltage difference between the control terminal g2 (gate terminal) and the second terminal s2 (source terminal) of the second photo transistor 218 is kept at a specific voltage difference, and a voltage level Vs1 of the second terminal s1 of the first photo transistor 216 is gradually dropped from high potential (−bV+ΔV2) to close to the voltage level (−bV) of the third scan line G3, that is, a voltage difference between the control terminal g1 (gate terminal) and the second terminal s1 (source terminal) of the first photo transistor 216 gradually changes from a negative value to close to 0. In other words, in the third period T3, a change rate of the voltage difference between the control terminal g1 (gate terminal) and the second terminal s1 (source terminal) of the first photo transistor 216 is affected by illumination intensity.

Figure 8:
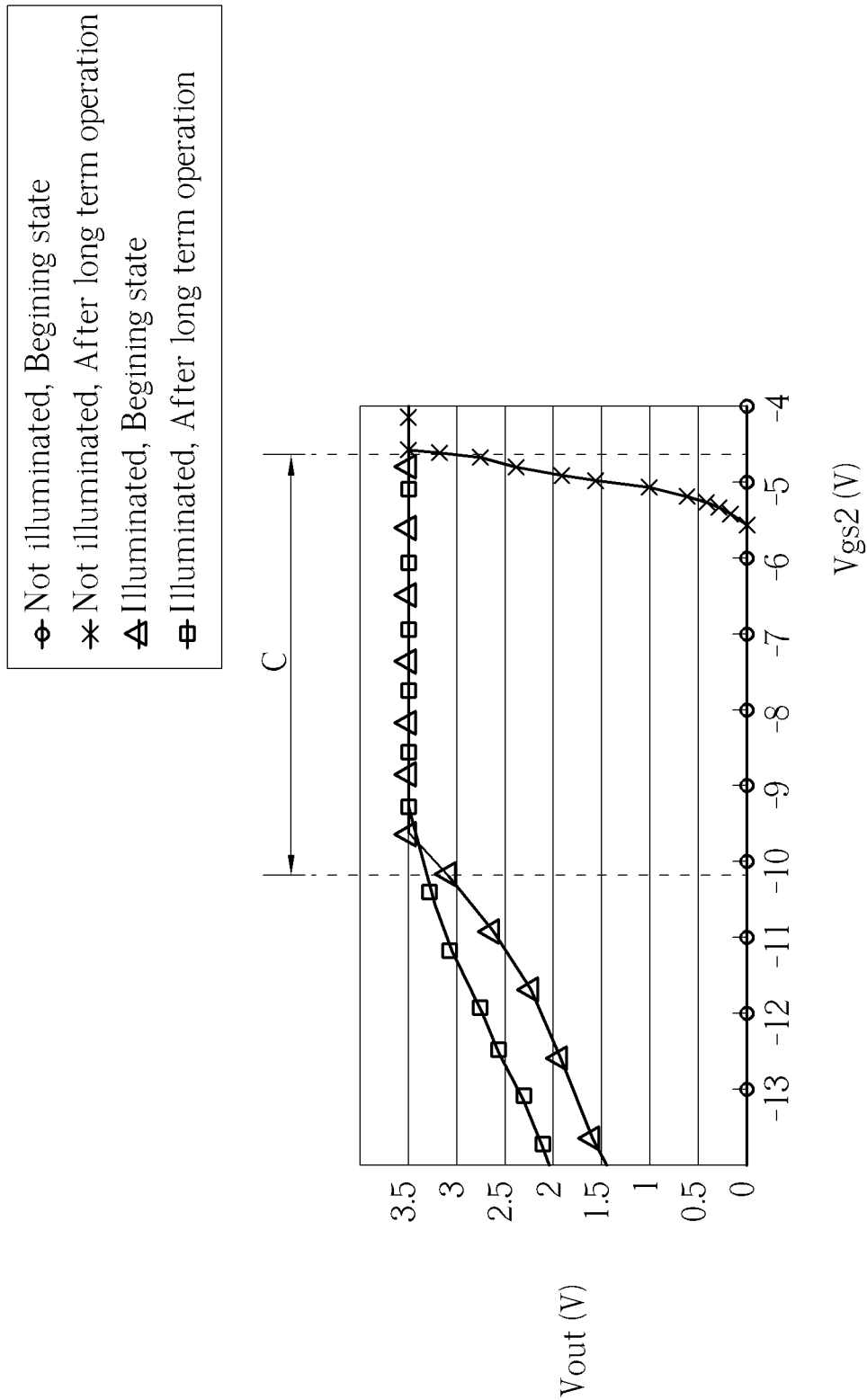
FIG. 8 is a diagram showing characteristic curves of the photo sensor of the present invention before and after long term operation.

Please refer to FIG. 8. FIG. 8 is a diagram showing characteristic curves of the photo sensor 210 of the present invention before and after long term operation. A horizontal axis of FIG. 8 represents the voltage difference Vgs2 between the control terminal g2 and the second terminal s2 of the second photo transistor 218, and the vertical axis of FIG. 8 represents the voltage level Vout read by the reading unit 220. According to the above arrangement, a combination of the first and second photo transistor 216, 218 can increase leakage current when being illuminated, and the first photo transistor 216 can decrease leakage current flowing through the second photo transistor 218 when not being illuminated, such that a signal difference of the photo sensor 210 between touched or not-touched is increased, and working areas have a bigger overlap part C. Therefore, when the voltage difference between the control terminal g2 and the second terminal s2 of the second photo transistor 218 is set at some specific voltage difference within the overlap working area C, the characteristics of the photo sensor is improved.

In addition, the photo sensor 210 can further comprise a second capacitor 215 electrically connected to the second terminal s1 of the first photo transistor 216, for adjusting a change rate of the voltage level of the second terminal s1 of the first photo transistor 216. For example, the second capacitor 215 can store more electricity, such that the change rate of the voltage level of the second terminal s1 of the first photo transistor 216 is slower. Therefore, capacitance of the second capacitor 215 can be determined according to design requirements.

Furthermore, light receiving areas of the first and second photo transistors 216, 218 can be identical or different according to design requirements.

Figure 9:
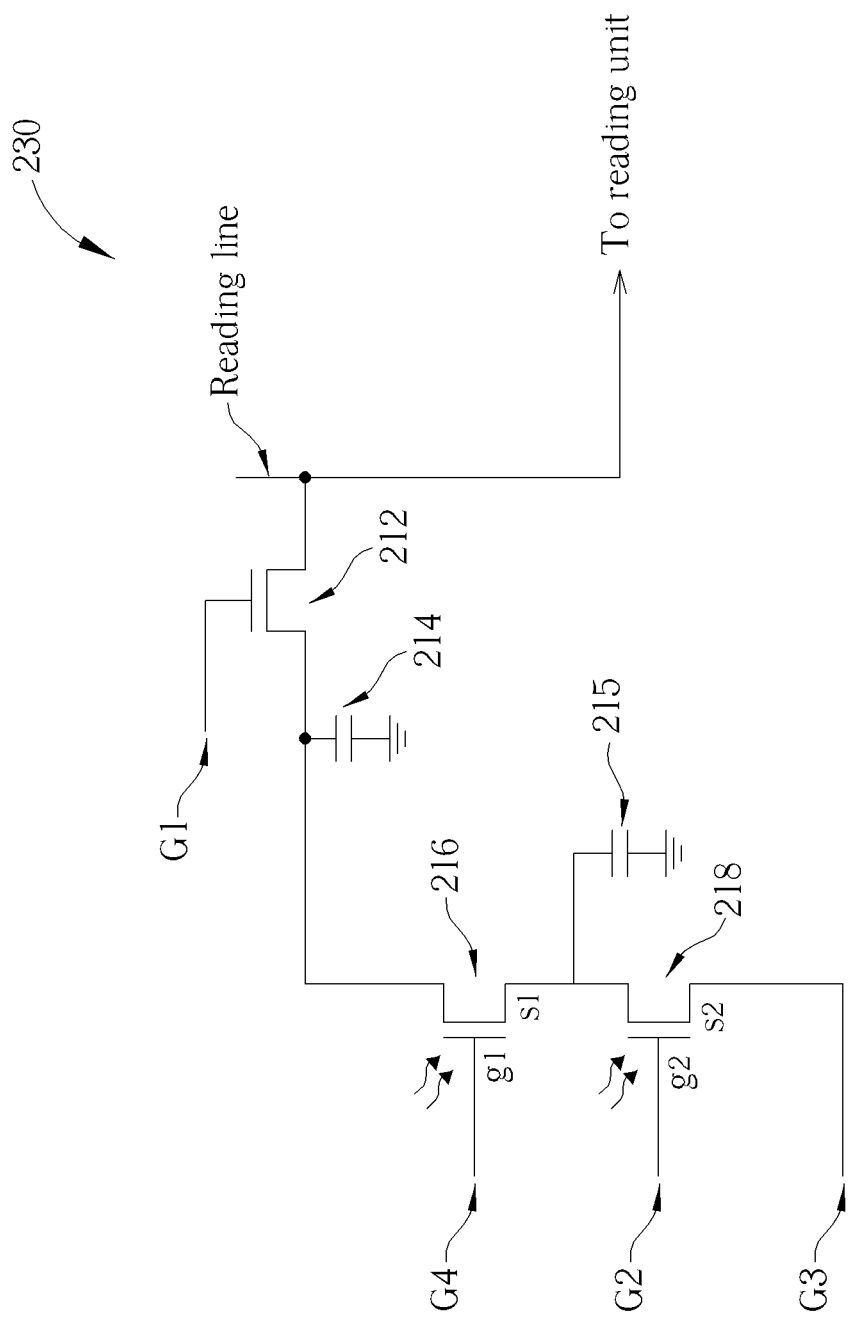
FIG. 9 is a diagram showing another embodiment of the photo sensor of the present invention.

Please refer to FIG. 9. FIG. 9 is a diagram showing another embodiment of the photo sensor of the present invention. Different from the photo sensor 210 of FIG. 6, the control terminal g1 of the first photo transistor 216 of FIG. 9 is electrically connected to a fourth scan line G4, and a voltage signal of the fourth scan line G4 is at low potential in the first period, at high potential in the second period, at low potential in the third period, and at low potential in the fourth period. The photo sensor 230 of FIG. 9 operates similar to the photo sensor 210 of FIG. 6, the voltage difference between the control terminal g1 (gate terminal) and the second terminal s1 (source terminal) also gradually changes from a negative value to 0.

Figure 10:
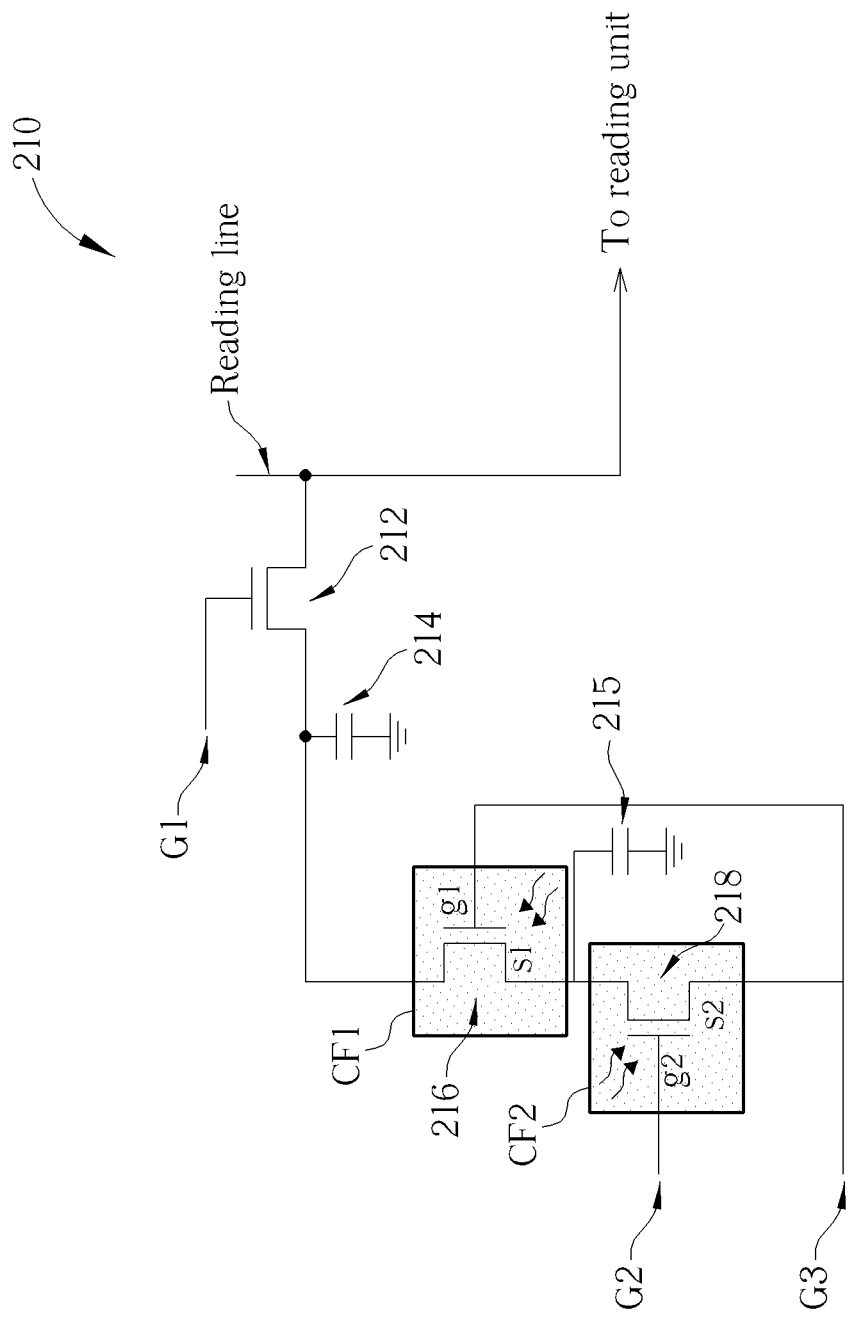
FIG. 10 is a diagram showing the photo sensor of the present invention in cooperation with a first color filter and a second color filter.
Figure 11:
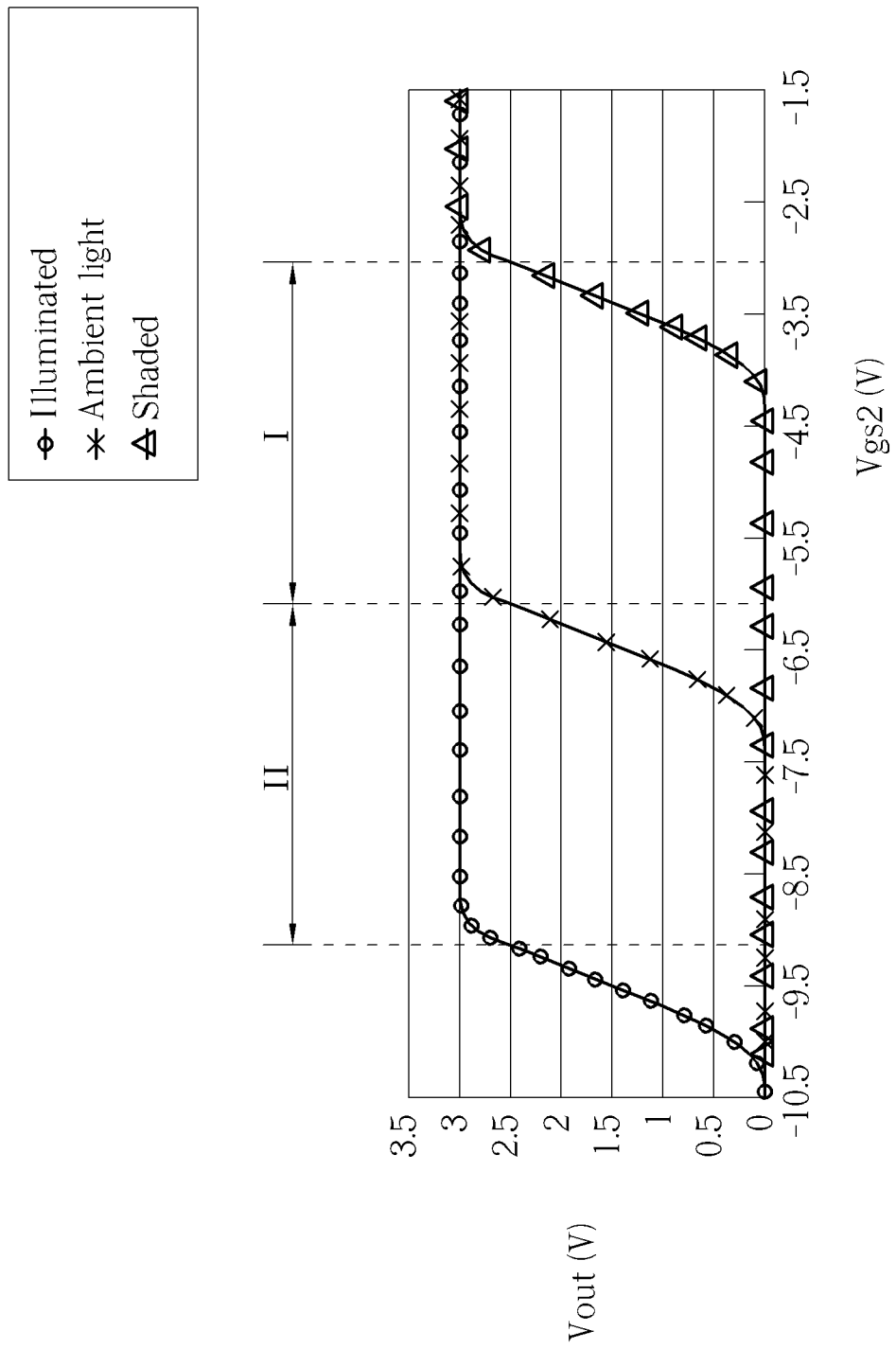
FIG. 11 is a diagram showing characteristic curves of the photo sensor of the present invention in cooperation with the first color filter and the second color filter.

In addition, please refer to FIG. 10 and FIG. 11 together. FIG. 10 is a diagram showing the photo sensor of the present invention in cooperation with a first color filter and a second color filter. FIG. 11 is a diagram showing characteristic curves of the photo sensor of the present invention in cooperation with the first color filter and the second color filter. The photo sensor 210 of the present invention can cooperate with the first color filter CF1 and the second color filter CF2 for allowing the photo sensor having two working areas, wherein one of the working area is utilized for detecting whether the photo sensor 210 is illuminated, and the other one of the working area is utilized for detecting whether the photo sensor 210 is shaded, or the working areas can be utilized for sensing two different light with different wavelengths. The first color filter CF1 can cooperate with the first photo transistor 216, and the second color filter CF2 can cooperate with the second photo transistor 218. Colors of the first and second color filters CF1, CF2 can be identical or different. As shown in FIG. 10, the photo sensor can work in a working area I for detecting whether the photo sensor is shaded (such as being shaded by a finger), and the photo sensor can work in a working area II for detecting whether the photo sensor is illuminated (such as being illuminated by a light pen). Therefore, the photo sensor of the present invention can be utilized both for detecting whether being shaded and whether being illuminated.

Summarizing the above, the photo sensor of the present invention utilizes the combination of the first and second photo transistors for increasing the leakage current when being illuminated, and for reducing the leakage current flowing through the second photo transistor when being not illuminated, so as to change working area of the photo sensor. The second photo transistor can be utilized for expanding the original working area of the first photo transistor.

In contrast to the prior art, the photo sensor of the present invention has larger working area, and the most of the working areas before and after long term operation are overlapped, such that the photo sensor of the present invention can work normally in the overlapped working area without causing the reading unit to misjudge.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photo sensor of a photo type touch panel, comprising:
  a transistor with a control terminal receiving a first control signal from a first scan line;
  a first capacitor directly connected to a first terminal of the transistor;
  a first photo transistor with a control terminal, a first terminal, and a second terminal, the first terminal of the first photo transistor being directly connected to the first capacitor;
  a second capacitor directly connected to the second terminal of the first photo transistor; and
  a second photo transistor with a control terminal receiving a second control signal from a second scan line, a first terminal directly connected to the second terminal of the first photo transistor, and a second terminal receiving a third control signal from a third scan line.

2. The photo sensor of claim 1, wherein the control terminal of the first photo transistor receives the third control signal.

3. The photo sensor of claim 1, wherein the control terminal of the first photo transistor receives a fourth control signal.

4. The photo sensor of claim 1, wherein a voltage difference between the control terminal and the second terminal of the first photo transistor is a variable.

5. A photo type touch panel, comprising:
  a plurality of pixels arranged in a matrix form;
  a plurality of data lines for transmitting display data to the plurality of pixels;
  a plurality of scan lines for transmitting scan signals to the plurality of pixels;
  a plurality of photo sensor sensors, each photo sensor comprising: a transistor with a control terminal directly connected to a first scan line of the plurality of scan lines;
  a first capacitor directly connected to a first terminal of the transistor; a first photo transistor with a first terminal directly connected to the first capacitor;
  a second capacitor directly connected to a second terminal of the first photo transistor; and
  a second photo transistor with a control terminal directly connected to a second scan line of the plurality of scan lines, a first terminal directly connected to the second terminal of the first photo transistor, and
  a second terminal directly connected to a third scan line of the plurality of scan lines; and
  a reading unit directly connected to a second terminal of the transistor for reading a voltage level of the first capacitor when the transistor is turned on.

6. The touch panel of claim 5, wherein the control terminal of the first photo transistor is electrically connected to the third scan line.

7. The touch panel of claim 5, wherein the control terminal of the first photo transistor is electrically connected to a fourth scan line.

8. The touch panel of claim 5, wherein the photo sensor further comprises a second capacitor electrically connected to the second terminal of the first photo transistor.

9. The touch panel of claim 5 further comprising:
  a first color filter arranged at a position corresponding to the first photo transistor; and
  a second color filter arranged at a position corresponding to the second photo transistor.

10. A control method for a photo sensor of a photo type touch panel, the photo sensor comprising a transistor with a control terminal receiving a first control signal from a first scan line,
  a first capacitor directly connected to a first terminal of the transistor, a first photo transistor with a control terminal directly connected to the first capacitor, and
  a second photo transistor with a control terminal receiving a second control signal from a second scan line, a first terminal directly connected to the second terminal of the first photo transistor, and a second terminal receiving a third control signal from a third scan line, the method comprising:
  in a first period, providing the first control signal with high potential, and providing the second control signal and the third control signal with low potential;
  in a second period following the first period, providing the second control signal and the third control signal with high potential, and providing the first control signal with low potential;
  in a third period following the second period, providing the first control signal, the second control signal, and the third control signal with low potential;
  in a fourth period following the third period, providing the first control signal with high potential, providing the second control signal and the third control signal with low potential, and a reading unit of the photo type touch panel reading a voltage level of the first capacitor;
  in the first period, providing the third control signal with low potential to the control terminal of the first photo transistor;
  in the second period, providing the third control signal with high potential to the control terminal of the first photo transistor;
  in the third period, providing the third control signal with low potential to the control terminal of the first photo transistor; and
  in the fourth period, providing the third control signal with low potential to the control terminal of the first photo transistor.

11. The method of claim 10 further comprising:
  in the first period, providing a fourth control signal with low potential to the control terminal of the first photo transistor;

in the second period, providing the fourth control signal with high potential to the control terminal of the first photo transistor;
in the third period, providing the fourth control signal with low potential to the control terminal of the first photo transistor; and
in the fourth period, providing the fourth control signal with low potential to the control terminal of the first photo transistor.

12. The method of claim 10 further comprising determining whether the photo sensor is touched according to the voltage level of the first capacitor read by the reading unit.

\* \* \* \* \*